United States Patent [19]

Kwon et al.

[11] Patent Number: 5,452,278
[45] Date of Patent: Sep. 19, 1995

[54] DISC RECOGNIZING METHOD FOR AN OPTICAL DISC PLAYBACK APPARATUS

[75] Inventors: Seok Kwon, Yeongcheon; Tae-jeon Kwon, Seoul; Jong-pil Kim, Kyungki-do, all of Rep. of Korea

[73] Assignee: Samsung Electronics Co., Ltd., Kyungki-do, Rep. of Korea

[21] Appl. No.: 16,936

[22] Filed: Feb. 12, 1993

[30] Foreign Application Priority Data

Feb. 28, 1992 [KR] Rep. of Korea .................. 92-3249

[51] Int. Cl.$^6$ .................. G11B 3/90; G11B 17/00; G11B 21/12
[52] U.S. Cl. .................. 369/58; 369/233; 369/44.27; 369/220
[58] Field of Search ... 369/54, 58, 44.32, 44.27–44.29, 369/244, 233, 219–221

[56] References Cited

U.S. PATENT DOCUMENTS

| | | | |
|---|---|---|---|
| 4,607,357 | 8/1986 | Okano | 369/58 |
| 4,680,744 | 7/1987 | Kanamaru | 369/58 |
| 4,829,508 | 5/1989 | Arita | 369/244 |
| 4,885,733 | 12/1989 | Tsuboi | 369/58 |
| 4,977,554 | 12/1990 | Hangai et al. | 369/244 |
| 5,065,253 | 11/1991 | Ishii | 369/58 |
| 5,172,354 | 12/1992 | Otsubo | 369/58 |

*Primary Examiner*—Robert S. Tupper
*Assistant Examiner*—Brian E. Miller
*Attorney, Agent, or Firm*—Sughrue, Mion, Zinn, Macpeak & Seas

[57] ABSTRACT

A disc recognizing method prevents a leaf spring of a pickup from being deformed in an optical disc playback apparatus including a pickup transfer for moving a pickup and a plurality of starting point detecting switches for recognizing a type of a seated disc. The method includes a disc recognizing step of recognizing the seated disc by virtue of an on state of a first starting point detecting switch which corresponds to the starting point of a laser disc when a playback mode is selected, a disc recognizing step of recognizing the seated disc by virtue of an on state of a second starting point detecting switch which corresponds to a compact disc, and a disc recognizing step of recognizing the seated disc by inwardly transferring the pickup for a predetermined period of time when a focusing operation fails after the first starting point detecting switch has been turned on.

3 Claims, 4 Drawing Sheets

DISC RECOGNIZING METHOD FOR AN OPTICAL DISC PLAYBACK APPARATUS

BACKGROUND OF THE INVENTION

1. Field of the Invention

The present invention relates to a disc recognizing method for recognizing the type of disc seated in an optical disc playback apparatus, and more particularly to a disc recognizing method which can prevent the deformation of a leaf spring used to support a pickup associated with the playback apparatus.

2. Description of the Related Art

Generally, optical disc playback apparatuses employ an optical disc as a recording medium, and are classified into compact disc playback apparatuses and laser disc playback apparatuses in accordance with the size of the disc utilized therewith. Recently, optical disc playback apparatuses capable of reproducing information recorded on different sized optical disc have been developed. Such a device controls the playback of a seated disc by utilizing a plurality of switches for detecting the starting point of recorded data.

In more detail, as illustrated in FIG. 1, first starting point detecting switch 7, which is adjacent to a turntable 2, and second starting point detecting switch 8 are utilized for detecting different playback starting points in accordance with the size of a disc 1. Then, playback is carried out, in accordance with the detection of the starting point corresponding to a compact disc or laser disc, for example. First starting point detecting switch 7 is installed at a position which corresponds to the starting point of a compact disc (or some other disc having the same playback starting point, i.e., the location of a leading area, as a compact disc), and the second starting point detecting switch 8 is installed at a position which corresponds to the starting point of a laser disc (or a disc with the same playback point as a laser disc).

FIG. 2 is a flowchart illustrating a conventional disc recognizing method which is briefly described below with reference to FIGS. 1 and 2. If an optical disc playback apparatus is set to a playback mode, according to a user-designated control command or input information, a drive device (not shown) moves pickup 3 to a home position which is outward from second starting point detecting switch 8 with respect to a radial direction of disc 1 (step 11). When pickup 3 is at the home position, system controller 12 controls the drive device to move pickup 3 inwardly with respect to the radial direction of the disc (step 12). Then, as pickup 3 passes second starting point detecting switch 8, this switch is turned "ON" (step 13). (Here, first and second starting point detecting switches 7 and 8 are also called "limit switches" since they inhibit pickup 3 from traveling further toward the inner circumference of the disc.) Pickup 3 stops, when system controller 12 determines that second starting point detecting switch 8 is "ON", and a focusing operation is attempted (step 15).

When the light reflected off of disc 1 during a focusing operation exceeds a predetermined level, it is determined that a focus-lock condition is obtained. At this time, in the absence of a disc, the reflected light would be below the predetermined level because no light is reflected. Accordingly, the focus-lock condition, or lack thereof, can be used to determine the presence or absence of a disc.

When the focus-lock condition is detected in step 16, pickup 3 detects the extent to which disc 1 is warped, in accordance the level of light received during the focusing operation. The disc may be warped due to its own weight, or due to the internal heat of the playback apparatus. The center of the disc is fixed to turntable 2 by a clamp (not illustrated). Accordingly, there is no warp in the disc at the center and the warp increases toward the circumference of the disc.

If disc 1 is not warped, the playback is performed normally. Whereas if disc 1 is warped, system controller 12 commands servo 11 to supply a tilt value signal based upon the level of reflected light, which depends on the distance between a surface of disc 1 and pickup 3, to tilt driver 9. Tilt driver 9 is activated in response to a signal from servo 11 at the moment of a focus-lock, and vertically adjusts pickup transfer 6, by causing pickup transfer 6 to pivot about a point which is located proximate the center of disc 1, in response to the tilt value supplied from servo 11, to compensate for the warp of the disc. As shown in FIG. 1, if the tilt value is the distance indicated by L, tilt driver 9 moves pickup transfer 6 downward from its original position 6' (denoted by the dotted line in FIG. 1). After pickup transfer 6 is adjusted by tilt driver 9, ordinary focusing and playback operations continue (step 17).

However, if it is determined that a focus-lock condition does not exist in step 16, focusing is again attempted and the focus-lock is checked (step 18). At this time, if focus-lock is accomplished by the refocusing attempt, the above-described step 17 is executed. However, if the focus-lock condition is not obtained in step 18, disc 1 is determined to not be present at the position of second starting point detecting switch 8 and focusing operations are terminated (step 19). In such a case, pickup 3 is transferred inwardly by the drive device. When pickup 3 reaches first starting point detecting switch 7, the controlling of the focusing is carried out in a manner similar to the method described above (steps 20 and 24). Since the frequency of warping of a compact disc tends to be less than that of a laser disc, after a previously reproduced laser disc is removed, pickup transfer 6 is in a tilted condition to compensate for warpage of the previously used laser disc.

When information recorded on a laser disc is subsequently reproduced, pickup transfer 6 is once again adjusted by controlling the operation of servo 11 and tilting driver 9 when pickup 3 reaches second starting point detecting switch 8, in the manner described above. Thus, normal playback is carried out without difficulty. However, as shown in FIG. 1, if a compact disc is reproduced, pickup 3 must be transferred to a position proximate first starting point detecting switch 7 while transfer device 6 is under a tilted condition. However, if first starting point detecting switch 7 is close to turntable 2 (such positioning is ordinarily required for playback of compact discs), portions of pickup 3 may come into contact with turntable 2 in the area indicated at A, and thus leaf spring 4, which supports optical elements of pickup 3, becomes deformed. At this time, minor deformation of leaf spring 4 merely results in a slightly longer time than normal for reading out information from the read-in area because of potential errors in focusing and tracking operations due to the improper position of elements supported by lead spring 4. However, severe deformation of the leaf spring inhibits playback or conversion from video to audio, and vice versa, in a compact disc which has both video and audio signals recorded thereon, because errors may occur in reading positional information relating to the various signals. Moreover, if a laser disc is reproduced while leaf spring 4 is in a deformed state, noise such as longitudinal and traversal lines will appear in the resulting picture because optical elements, including objective lens 5, which are supported by leaf spring 4, may not be properly positioned.

SUMMARY OF THE INVENTION

It is the object of the present invention to provide a disc recognizing method capable of determining the type of a seated disc in a predetermined area which is between first and second starting points, so as to prevent the deformation of a leaf spring used to support the lens of an optical pickup.

To achieve the above object of the present invention, there is provided a disc recognizing method in an optical disc playback apparatus including a pickup transfer device, for moving pickup, and a plurality of starting point switches. The method includes a first disc recognizing step wherein the pickup is detected by a first starting point detecting switch, which corresponds to a laser disc, when a playback mode is selected, A second disc recognizing step wherein the pickup is moved inwardly for a predetermined time period when a focus-lock is not obtained after the first starting point detecting switch has been turned on in the first disc recognizing step, and a third disc recognizing step wherein the pickup is detected by a second starting point detecting switch, which corresponds to a compact disc.

BRIEF DESCRIPTION OF THE DRAWINGS

The above objects and other advantages of the present invention will become more apparent by explaining in detail a preferred embodiment thereof with reference to the attached drawings in which.

DETAILED DESCRIPTION OF THE PREFERRED EMBODIMENT

Figure 1:
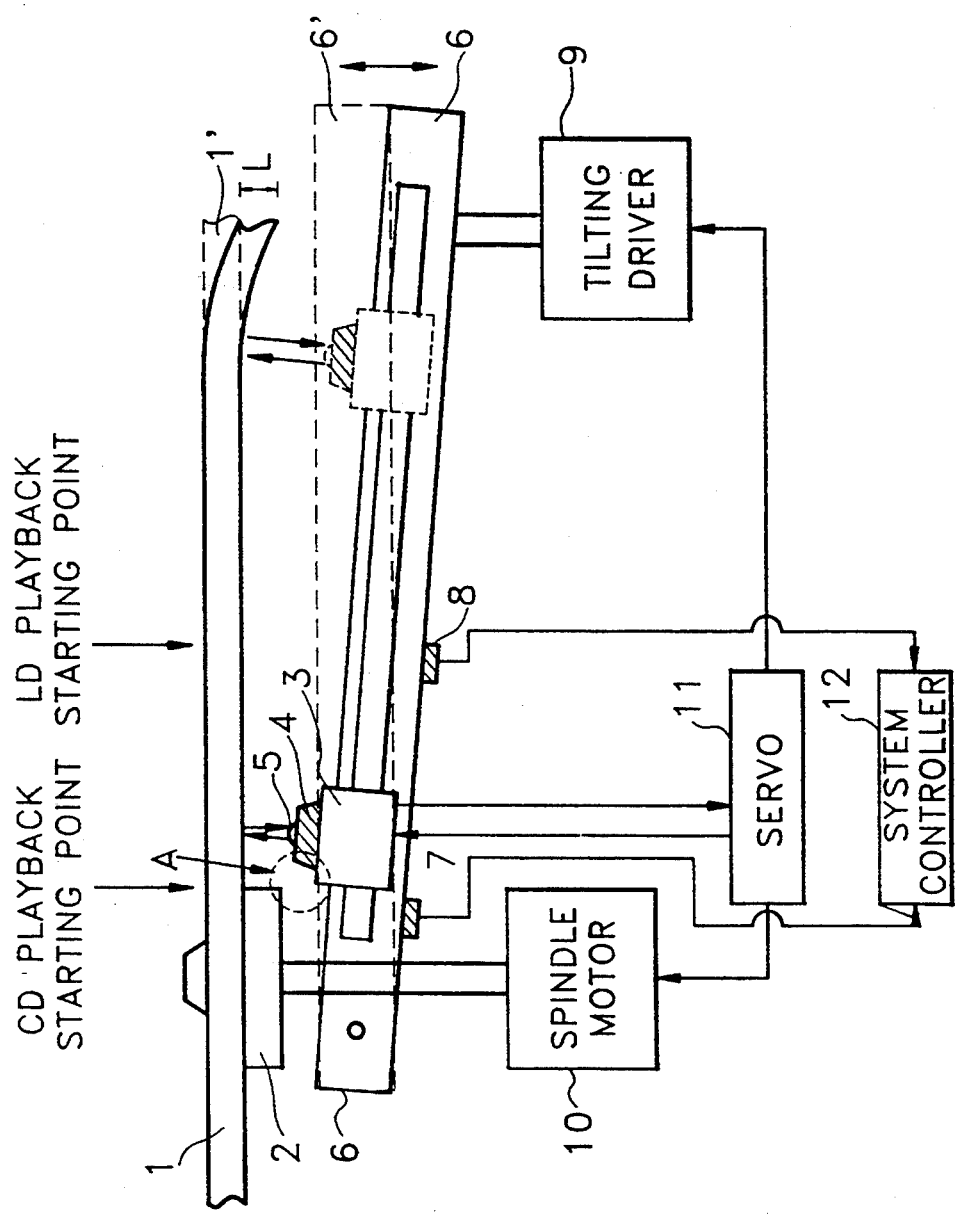
FIG. 1 is a view of an optical disc playback apparatus.

FIG. 1 is a block diagram of an optical disc playback apparatus which has been described above with respect to the conventional disc recognizing method, and thus will only be briefly described below.

In FIG. 1, an optical disc playback apparatus includes, turntable 2 for supporting disc 1, spindle motor 10 for rotating disc 1, pickup 3 for reading out information recorded on disc 1, leaf spring 4 which supports movable objective lens 5 so as to allow focusing and tracking of pickup 3, pickup transfer 6 provided between turntable 2 and spindle motor 10 for moving pickup 3, first starting point detecting switch 7 installed under pickup transfer 6 for detecting when pickup 3 is at a position which corresponds to the starting point of a compact disc, second starting point detecting switch 8 for detecting when pickup 3 is at a position which corresponds to the starting point of a laser disc, tilting driver 9 connected to the lower portion of pickup transfer 6 for controlling the position of pickup transfer 6 in the vertical direction according to extent of warpage of disc 1 detected by pickup 3, servo 11 for controlling spindle motor 10, pickup transfer 6, and tilting driver 9, and system controller 12 for controlling the operation of servo 11. Servo 11 also controls the focusing and tracking operations of pickup 3, and uses the results of the above described focus-lock determination to determine the amount of tilt required due to the warpage of the disc, to control tilting driver 9.

Figure 3A:
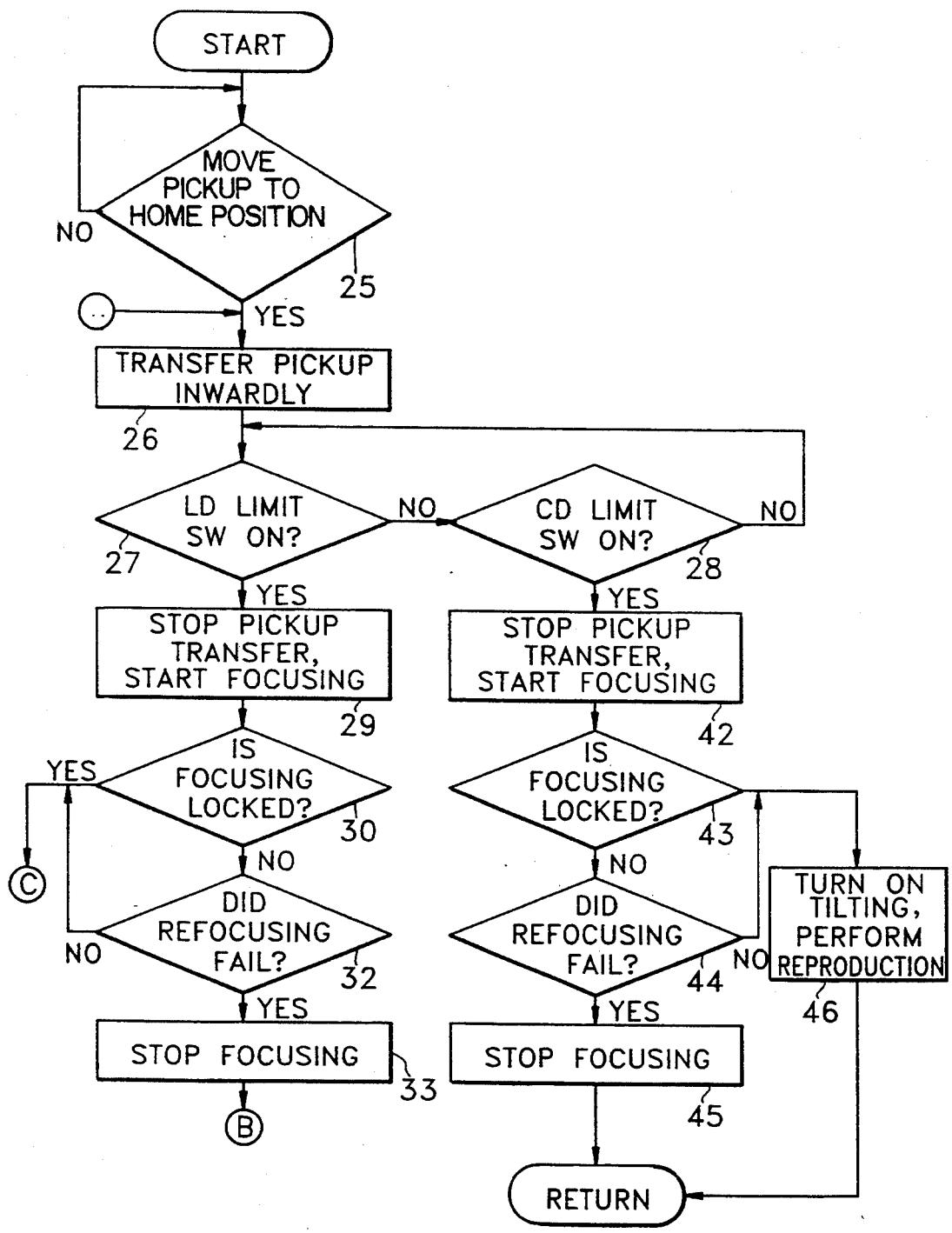
FIGS. 3A and 3B are flowcharts illustrating a disc recognizing method according to a preferred embodiment of the present invention.
Figure 3B:
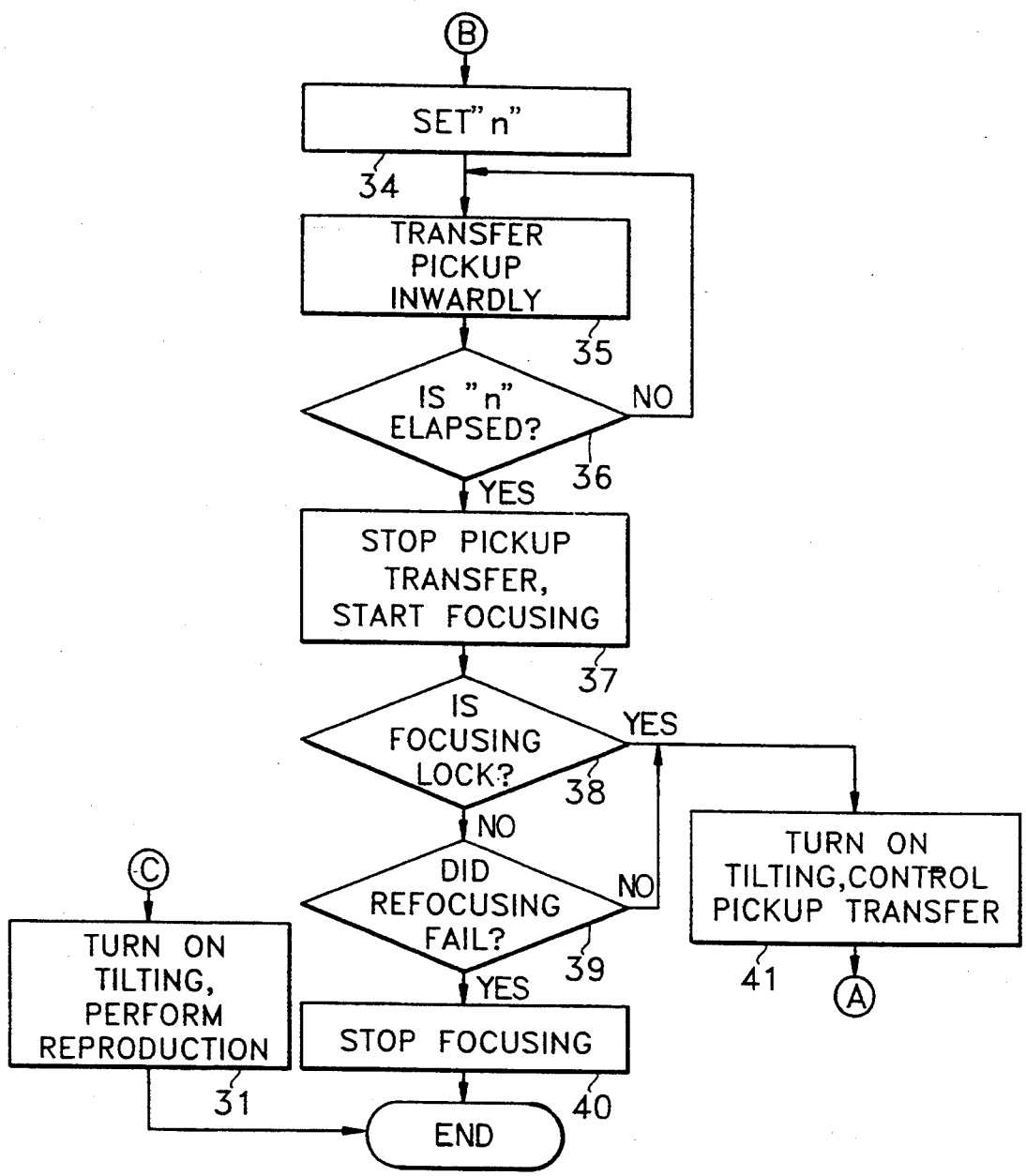

FIGS. 3A and 3B are flowcharts illustrating a disc recognizing method according to the preferred embodiment of the present invention. Step 25 is for transferring pickup 3 to a home position during the playback mode. Steps 26 to 28 are for detecting the state of starting point detecting switches 7 and 8. Steps 29 through 33 constitute a first disc recognizing step which is conducted in response to an on state of second starting point detecting switch 8. Steps 34 to 41 constitute a second disc recognizing step which recognizes a disc by moving pickup 3 inwardly for a predetermined time when a disc is not recognized in the first disc recognizing step. Finally steps 42 to 46 constitute a third disc recognizing step which is conducted in response to an on state of first starting point detecting switch 7.

Figure 2:
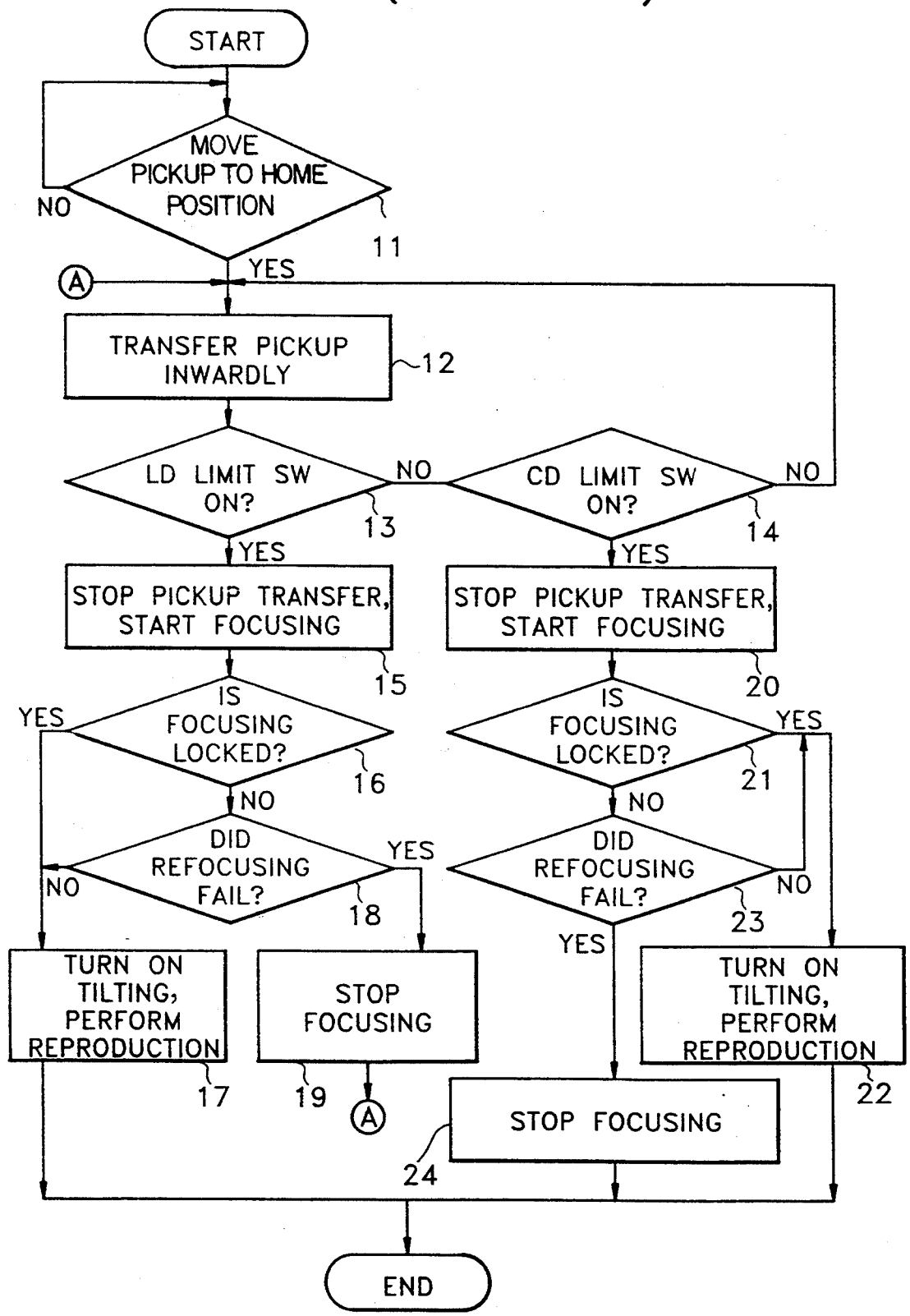
FIG. 2 is a flowchart illustrating a conventional disc recognizing method.

The first and third disc recognizing steps are similar to corresponding steps in FIG. 2, which were described above with respect to a conventional method, and thus will not be described further. The disc recognizing method according to the preferred embodiment of the present invention will be described below with particular attention to the second disc recognizing step.

If the focus-lock condition is not obtained upon the turning on of second starting point detecting switch 8 for reproducing a laser disc (step 32), it is determined that the size of disc 1 is such that its starting point does not correspond to the position of second starting point detecting switch 8, and pickup 3 is thus transferred inwardly for a predetermined time period n. The length of time period n is preset so as to allow pickup 3 to be moved to a recognizing position which is preset in system controller 12 (step 34). Preferably, the disc recognizing position is between first start position detecting switch 7 and second start point detecting switch 8 and corresponds to an information recording area of disc 1. In particular, pickup 3 is moved inwardly until the time n has elapsed (step 35). At this time, the movement of pickup 3 is controlled by means of servo 11, and the time period n is that required for the pickup to travel from a position proximate second starting point detecting switch 8 to the desired disc recognizing position.

After the time n has elapsed (step 36), the movement of pickup 3 is stopped and the focusing operation is carried out (step 37). If a focus-lock condition is not detected after performing the focusing operation, the operation is executed again (step 39), and if a focus-lock is still not obtained, the focusing operation is terminated (step 40). However, since the disc recognizing position corresponds to an area having substantial information recorded thereon, a focus-lock will be easily obtained.

When the extent of warpage of disc 1 is determined in accordance with the level of reflected light during focusing, tilting driver 9 is controlled by servo 11 to adjust pickup transfer 6 for reproducing the disc (step 41). Thereafter, pickup 3 is inwardly transferred to a position corresponding to first starting point detecting switch 7, and then playback is carried out from the playback starting point of disc 1 upon detection of an on state of first starting point detecting switch 7.

As described above, the disc recognizing method according to the present invention is advantageous in that the tilting state of a pickup transfer is readjusted between the outer starting-detection point and the inner starting-detection point when transferring a pickup from the former to the latter, thereby preventing the deformation of a leaf spring of the pickup due to contact with a turntable, which is caused by the transfer of the pickup to the inner starting-detection point while the pickup transfer is in a highly tilted state.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A disc recognizing method for an optical disc playback apparatus, said apparatus including a pickup transfer device for guiding a pickup in a radial direction and a plurality of starting point detecting switches for respectively detecting said pickup when a position thereof corresponds to a starting point, which corresponds to an innermost data portion of a seated disc, said method comprising the steps of:

a first disc recognizing step comprising, moving said pickup, in a radial direction with respect to the seated disc, to a first position which is proximate a first of said starting point detecting switches which corresponds to starting point of a first type of disc, and attempting a focusing operation of said pickup;

a second disc recognizing step comprising moving said pickup, in the radial direction, inwardly from said first position and stopping motion of said pickup in response to a lapse of a predetermined time period when a focus-lock condition is not reached in said first disc recognizing step, and attempting another focusing operation of said pickup; and a third disc recognizing step comprising moving said pickup, in the radial direction, to a second position which is proximate a second of said starting point detecting switches which corresponds to a starting point of a second type of disc and attempting another focusing operation, wherein said predetermined time period is set so as to allow said pickup to advance to a predetermined position which is between said first and second positions.

2. A disc recognizing method as claimed in claim 1, wherein said second disc recognizing step further comprises the step of:

controlling the position of said pickup transfer device in accordance with the extent of tilt of a disc from a predetermined position determined during the focusing operation carried out after moving said pickup for said predetermined time period.

3. A disc recognizing method as claimed in claim 2 wherein said first type of disc is a laser disc and said second type of disc is a compact disc.

* * * * *